US009070000B2

(12) United States Patent
Terwilliger et al.

(10) Patent No.: US 9,070,000 B2
(45) Date of Patent: Jun. 30, 2015

(54) SECONDARY INFORMATION FOR AN INFORMATION HANDLING SYSTEM MATRIX BAR CODE FUNCTION (71) Applicant: Dell Products L.P., Round Rock, TX (US)

(72) Inventors: Kevin D. Terwilliger, Austin, TX (US); Orin M. Ozias, Austin, TX (US); Scott C. Lauffer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 184 days.

(21) Appl. No.: 13/655,149

(22) Filed: Oct. 18, 2012

(65) Prior Publication Data
US 2014/0112551 A1 Apr. 24, 2014

(51) Int. Cl.
*G06K 9/00* (2006.01)
*G06K 7/00* (2006.01)
*G06K 7/14* (2006.01)
*G06Q 10/00* (2012.01)

(52) U.S. Cl.
CPC ............ *G06K 7/0004* (2013.01); *G06K 7/1417* (2013.01); *G06K 9/00221* (2013.01); *G06K 9/00* (2013.01); *G06K 7/1434* (2013.01); *G06Q 10/00* (2013.01)

(58) Field of Classification Search
None
See application file for complete search history.

(56) References Cited

U.S. PATENT DOCUMENTS

| 5,992,752 | A | * | 11/1999 | Wilz et al. | 235/472.01 |
|---|---|---|---|---|---|
| 6,802,454 | B1 | * | 10/2004 | McMurtry et al. | 235/494 |
| 7,702,162 | B2 | | 4/2010 | Cheong et al. | |
| 7,751,629 | B2 | | 7/2010 | Cheong et al. | |
| 7,841,531 | B2 | | 11/2010 | Onogi | |
| 8,490,861 | B1 | * | 7/2013 | Cidambi et al. | 235/375 |
| 2001/0045461 | A1 | * | 11/2001 | Schuessler | 235/462.07 |
| 2005/0011958 | A1 | * | 1/2005 | Fukasawa et al. | 235/462.46 |
| 2005/0162699 | A1 | * | 7/2005 | Fukunaga et al. | 358/1.18 |
| 2005/0224572 | A1 | * | 10/2005 | Kelley et al. | 235/375 |
| 2007/0092141 | A1 | | 4/2007 | Hagino | |
| 2008/0128492 | A1 | * | 6/2008 | Roth et al. | 235/380 |
| 2008/0267504 | A1 | | 10/2008 | Schloter et al. | |
| 2009/0219556 | A1 | * | 9/2009 | Kato et al. | 358/1.13 |
| 2010/0057586 | A1 | | 3/2010 | Chow | |
| 2011/0002012 | A1 | | 1/2011 | Amagai | |
| 2011/0085951 | A1 | * | 4/2011 | Nakahana et al. | 422/549 |
| 2011/0233284 | A1 | | 9/2011 | Howard | |
| 2011/0287834 | A1 | | 11/2011 | Lindmeir et al. | |
| 2011/0313893 | A1 | | 12/2011 | Weik, III | |
| 2012/0138671 | A1 | | 6/2012 | Gaede et al. | |
| 2012/0138679 | A1 | | 6/2012 | Doyle | |
| 2012/0198572 | A1 | | 8/2012 | Beals et al. | |
| 2012/0203697 | A1 | | 8/2012 | Morgan et al. | |
| 2012/0278236 | A1 | * | 11/2012 | Jain et al. | 705/44 |

(Continued)

*Primary Examiner* — Randolph I Chu
(74) *Attorney, Agent, or Firm* — Terrile, Cannatti, Chambers & Holland, LLP; Robert W. Holland (57) ABSTRACT

An information handling system analyzes secondary information captured with an image of a two-dimensional barcode to perform a function. For example, a mobile phone camera captures an image of a QR code at a product plus characters printed next to the QR code, uses optical code recognition to determine the characters, and applies information from the QR code and the characters to register the product. As another example, a security indicator is captured with an image of the QR code and applied to access information of the QR code, such as by using GPS position information, local network information, or telephone number information to encrypt and/or decrypt information stored in the QR code.

17 Claims, 6 Drawing Sheets

(56) References Cited

U.S. PATENT DOCUMENTS

| | | |
|---|---|---|
| 2013/0001291 A1 | 1/2013 | Ibrahimbegovic et al. |
| 2013/0111208 A1 | 5/2013 | Sabin et al. |
| 2013/0124855 A1 | 5/2013 | Varadarajan et al. |
| 2013/0136363 A1* | 5/2013 | Na .................................. 382/190 |
| 2013/0173915 A1 | 7/2013 | Haulund |
| 2013/0191640 A1 | 7/2013 | Bloomer |
| 2013/0286199 A1* | 10/2013 | Di Censo et al. ............. 348/143 |
| 2013/0291074 A1 | 10/2013 | Dittrich |

* cited by examiner

SECONDARY INFORMATION FOR AN INFORMATION HANDLING SYSTEM MATRIX BAR CODE FUNCTION

CROSS REFERENCE TO RELATED APPLICATIONS

U.S. patent application Ser. No. 13/655,221, entitled "Secure Information Handling System Matrix Bar Code," inventors Kevin D. Terwilliger, Orin C. Ozias, and Scott M. Lauffer, filed on same day herewith, describes exemplary methods and systems and is incorporated by reference in its entirety.

BACKGROUND OF THE INVENTION

1. Field of the Invention

The present invention relates in general to the field of information handling system bar codes, and more particularly to secondary information for an information handling system matrix bar code function.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have over time included more powerful processing components that cooperate to process and store information. This trend has allowed manufacturers to build information handling systems from smaller and more powerful components into smaller and more compact housings. Today, mobile telephones perform many functions historically performed by desktop and laptop information handling systems, such as providing web browsing and e-mail functions. A typical "smartphone" is essentially a small tablet information handling system in a housing sized to hold as a handset during a telephone call. One side of the tablet housing exposes a touchscreen display that presents information and accepts inputs made with the aid of graphical user interfaces. The housing typically has an integrated camera to allow an end user to take pictures and store the pictures in memory integrated in the housing, such as flash memory of a solid state drive (SSD). To perform web browsing or e-mail functions, the end user activates an appropriate application through the touchscreen and interacts with the application through the touchscreen. Although the small size of smartphone information handling systems provides convenient and easy-to-use consumption of information for end users, the small size of the touchscreen can make typed inputs by an end user slow and difficult. For example, in order to input a web address at a web browser, an end user typically manipulates a keyboard at a touchscreen, which takes time, concentration and usually involves a number of minor mistakes.

One shortcut for inputting a web address to a smartphone information handling system is provided by the use of Quick Response (QR) codes. A QR code is a type of matrix barcode, also known as a two-dimensional code, that stores information with black modules arranged in a square pattern on a white background. A QR code is detected as a two-dimensional image by a camera that is then digitally analyzed to decode information stored by the black modules. Typically, a processor locates three distinctive fiducial squares at the corners of the image and a smaller square near the fourth corner to normalize the image for size, orientation and angle of viewing so that modules can be converted to binary numbers and validity checked with an error-correcting code. If the information stored by a QR code provides a web address, then a smartphone end user can open a browser to the web address embedded in the QR code by taking a picture of the QR code with a camera of the smartphone and then analyzing the picture with an application running on a processor of the smartphone. QR code reader applications are typically available at no charge for download and use on most smartphones.

Advertisers have taken advantage of QR codes to enrich advertising content that an end user finds of interest. For example, an advertisement includes a QR code that embeds a web address with additional advertisement content. If an end user finds the advertisement of interest, the end user takes a picture of the QR code with a smartphone and allows the smartphone browser to automatically present information from the web address, which is decoded by a QR code reader application running on the smartphone. In addition to the web address, the QR code can include identification information that indicates where the QR code was captured by an end user. For example, a URL encoded in the QR code includes information associated with a location.

One disadvantage of ready access to QR code information is that virtually anyone with a smartphone can take an image of and decode virtually any QR code. In some instances, a QR code may include product related information or a confidential nature that is only intended for use by a particular end user, such as a purchaser of a product. For example, a storage device sold at a store might include a QR code with information that aids an end user in setting up the storage device; if an individual with malicious intent takes an image of the QR code before purchase of the storage device by an end user, then information gleamed from the storage device might further malicious intentions of the individual, such as attempts to hack the storage device. Similar security concerns exists where other types of confidential information is stored in and then communicated by a QR code.

Another difficulty with embedding information in a QR code is that printing individual QR codes for specific information can be an expensive and complex process. For example, printing a series of QR codes with each having a different serial string of information typically uses specialized printing and management software to monitor the use of each QR code. Once the QR codes are printed, care is required to ensure that each QR code ends up on a desired product or at a desired location. If the information embedded in a QR code is encrypted, monitoring the information provided by each QR code has increased difficulty in that an encrypted QR code is more difficult to test once it is attached to a product since the tester must have access to the key for decrypting the QR code.

SUMMARY OF THE INVENTION

Therefore a need has arisen for a system and method which supports secure information handling system matrix bar codes, such as QR codes.

In accordance with the present invention, a system and method are provided which substantially reduce the disadvantages and problems associated with previous methods and systems for using matrix bar codes in a secure manner. Secondary information captured with a QR code is applied to aid in performance of a function with the QR code, such as configuration of a product having the QR code attached to it or to its packaging. The secondary information is available to restrict access to information in the QR code from unauthorized individuals.

More specifically, an information handling system captures an image of a QR code, such as with an integrated camera, and also captures secondary information to support performance of a function, such as configuration or registration of a product. Secondary information includes information captured with the image of the QR code and/or information available at the information handling system that captures the image, such as GPS location, local area network information, a telephone number, or other distinguishing information. In one embodiment, the information handling system applies the secondary information and QR code information to perform a function, such as configuration of the product. In an alternative embodiment, the information handling system applies the secondary information to access restricted information associated with the QR code, such as by decrypting the QR code or providing an input to a network location having an address provided by the QR code.

The present invention provides a number of important technical advantages. One example of an important technical advantage is that one QR code supports multiple products and users by incorporating secondary information with QR code information to perform a function, such as configuration of the products. The QR code provides the location or type of secondary information, such as the location of a serial number or the use of information proximate to the characters MAC, so that one common and inexpensive printing of the QR code will work in multiple products. This decreases the cost and complexity associated with use of QR codes to perform functions. Another example of an advantage is that QR codes that are publicly accessible have their content restricted from access by unauthorized individuals. For example, an application uses secondary information to restrict access to at least part of a QR code so that unauthorized individuals will have greater difficulty using a QR code for malicious purposes. For instance, using a GPS location of an expected delivery to decrypt the QR code or access a network location of a network address of a QR code discourages unauthorized individuals from attempting to use the QR code for malicious purposes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information captured by an information handling system at the capture of a two-dimensional barcode is analyzed together with the two-dimensional barcode to provide a function supported by the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
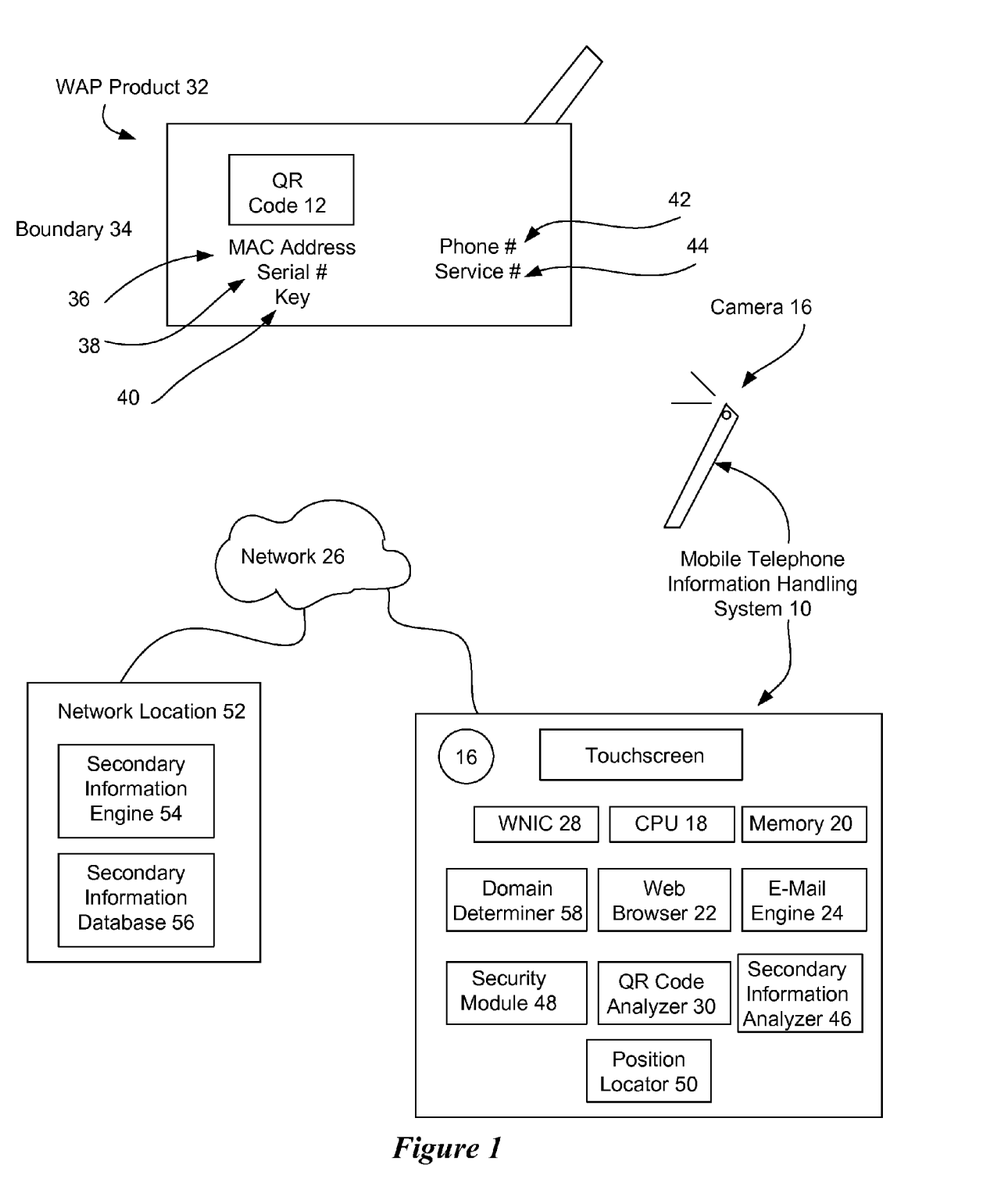
FIG. 1 depicts a mobile telephone information handling system capturing a two-dimensional barcode and secondary information to perform a function.

Referring now to FIG. 1, a mobile telephone information handling system 10 is depicted capturing a two-dimensional barcode 12 and secondary information to perform a function. Although FIG. 1 depicts a mobile telephone information handling system 10, in alternative embodiments other types of information handling systems may be used, such as tablet or laptop information handling systems of various sizes and capabilities. Mobile telephone information handling system 10 is configured essentially as a small tablet information handling system having a housing 14 sized to act as a telephone handset. Two-dimensional bar code 12 is depicted as a QR code, however, in alternative embodiments other types of matrix barcodes may be used to provide information for capture by an information handling system, such as with analysis of an image captured by a camera 16. In the example embodiment, mobile telephone information handling system 10 has a processor 18 that executes instructions stored in a memory 20. For example, a web browser application 22 and e-mail application 24 execute on processor 18 to interface with a network 26 through a wireless network interface card (WNIC) 28, such as a wireless local area network (WLAN) or wireless wide area network (WWAN) interfaced with the Internet.

Camera 16 of mobile telephone information handling system 10 captures an image of QR code 12 and stores the image in memory 20 for analysis by a QR code analyzer 30. QR code analyzer 30 analyzes the image to extract embedded information stored in QR code 12, such as a network address URL or e-mail address. QR code analyzer 30 applies the barcode information retrieved from QR code 12 to perform a function, such as opening a web page for the network address URL with web browser 22 or sending an e-mail to the e-mail engine with e-mail engine 24. Alternative types of two-dimensional barcodes may perform alternative functions with alternative types of barcode information stored in two-dimensional barcode 12, as is known in the art. The present disclosure is not limited to the use of just QR codes for just the functions of web browsing and e-mail. The present disclosure provides for the use of secondary information and security indicators to enhance the usefulness of two-dimensional barcode reading by information handling systems such as mobile telephone information handling system 10.

In the example embodiment, QR code 12 is affixed to a product 32, such as with a sticker glued to a wireless access point (WAP). Outside of the boundary 34 of QR code 12, product 32 has a variety of other types of information that is secondary to the information of QR code 12 and captured in an image taken by camera 16 of QR code 12. For example, product 32 has a MAC address 36, serial number 38 and security key 40 printed on one or more stickers below QR code 12. Off to one side of QR code 12, a phone number 42 to call for service and a service number 44 to uniquely identify the product are printed on another sticker. The secondary information of MAC address 36, serial number 38, key 40, phone number 42 and service number 44 are printed as characters and in some instances may include a one-dimensional barcode next to the characters.

An end user captures an image of product 32 in order to perform a function associated with product 32 using barcode information of QR code 12. For example, in the instance where product 32 is a WAP, QR code 12 includes a network address for a network location that assists in configuration of the WAP for use in a network of the end user. In an alternative example, product 32 may be an information handling system pre-loaded with software having a license key printed next to QR code 12, which stores a network address for registration of the software. The image captured by the end user includes the secondary information within camera view. QR code analyzer 30 analyzes the image capture of the QR code to extract the barcode information, such as the configuration or registration network addresses of the example embodiments. In addition to extracting the network address, QR code analyzer 30 extracts barcode information that indicates the type or location of secondary information for use in performing the function, such as the configuration or registration functions of the example embodiments. For instance, barcode information indicates the location of MAC address 36 for use in configuration of a WAP or key 40 for use in registration of software.

Once QR code analyzer 30 extracts barcode information from QR code 12 that indicates the location of secondary information, a secondary information analyzer 46 analyzes the image by applying the barcode information to extract the secondary information. For instance, if product 32 is a WAP and barcode information indicates the location of MAC address 36 immediately below QR code 12, then secondary information analyzer 46 extracts the MAC address information from that location. Once the configuration network address and MAC address are extracted from the image, QR code analyzer 30 provides the network address to web browser 22 and inserts the MAC address into a field of web page called up by the web address to initiate configuration of the WAP. Similarly, in the example where product 32 is an information handling system having preloaded software, QR code analyzer 30 provides the registration network address to web browser 22 and inserts key 40 into a field of the web page called up by the web address to initiate registration of the software. In the example embodiment, secondary information analyzer 46 is an optical character recognition (OCR) analyzer that creates a digital representation of characters presented at product 32. In an alternative embodiment, secondary information analyzer 46 is a one-dimensional barcode reader that reads a one-dimensional barcode to determine the secondary information. In alternative embodiments, alternative types of recognition techniques may be used, such as recognition of a shape of a product or a logo depicted on a product to identify the product.

In one embodiment, secondary information analyzer 46 determines secondary information without first obtaining a location or type of the secondary information from the barcode information. For example, secondary information analyzer 46 may identify the MAC address by locating the characters "MAC address" and analyzing characters nearby that match the type used for a MAC address. In one embodiment, secondary information analyzer 46 is located at a network address provided by QR code 12 and web browser 22 sends a copy of the image captured by camera 16 to allow analysis of the secondary information at the website. In an alternative embodiment, web browser 22 contacts the network address provided by barcode information extracted from QR code 12 to download secondary information analyzer 46 as an application that can then execute to determine the secondary information with a location programmed in the application. Alternatively, web browser 22 contacts the network address provided by barcode information extracted from QR code 12 to download a location or type (e.g., MAC address) of the secondary information so that secondary information analyzer 46 can determine the secondary information.

One advantage of using barcode information and secondary information to perform a function associated with product 32 is that one QR code 12 may be mass produced and put on plural products 32, yet an individualized function is made available from the common QR code. Using a common QR code provides reduced expense and complexity to avoiding the need for serial printing of individualized QR codes for each product 32. For example, the network address for a product 32 stored in a QR code 12 affixed to the product with a label will by itself provide a web address to a QR code analyzer 30 that opens a web page in a browser 22 for the product 32. However, if a secondary information analyzer 46 analyzes an image of QR code 12 to determine a serial number 38 for the individual product 32, then appending the serial number 38 to the web address extracted from QR code 12 results in web browser 22 retrieving a web page specific to the individual product 32. Similar applications of barcode and secondary information might apply in other situations, such as where a two-dimensional barcode advertisement is placed on a store window for a mobile telephone to capture along with secondary information that identifies the store location. In such an example, the secondary information might include text near a QR code, an image of a product, a facade of the store or GPS information from the mobile telephone. By including the secondary information with barcode information, a web browser of the mobile telephone is able to retrieve a web page for the product with the barcode information at the store location indicated by the secondary information using a QR code that is common to plural stores.

One disadvantage of using barcode information and secondary information to perform a function associated with product 32 is that unauthorized individuals might attempt to perform the function with a QR code analyzer 30 and, for instance, manual entry of secondary information. A security module 48 reduces the risk of unauthorized access to a function by adding security features to the access of barcode and secondary information. In one example embodiment, a position locator 50 of mobile telephone information handling system 10, such as a GPS receiver, determines the latitude and longitude position at the time an image is taken and communicates the position to a network location 52 using a network address provided by barcode information extracted from QR code 12. A secondary information engine 54 running at network location 52, such as an application running on a server information handling system, receives the position information and compares the position information with expected position information of a secondary information database 56 to authorize the function only with an authorized position. In an alternative embodiment, position is provided by a domain determiner 58 interfaced with WNIC 28 of mobile information handling system 10. For instance, position is indicated by an IP address or domain of a wireless local area network interfaced with WNIC 28 that is sent to secondary information engine 54 to confirm authorization for the function associated with the QR code 12 of product 32. In alternative embodiments, security module 48 obtains access to a secured function using a variety of secondary information as security indicators as set forth herein in greater detail below.

Figure 2:
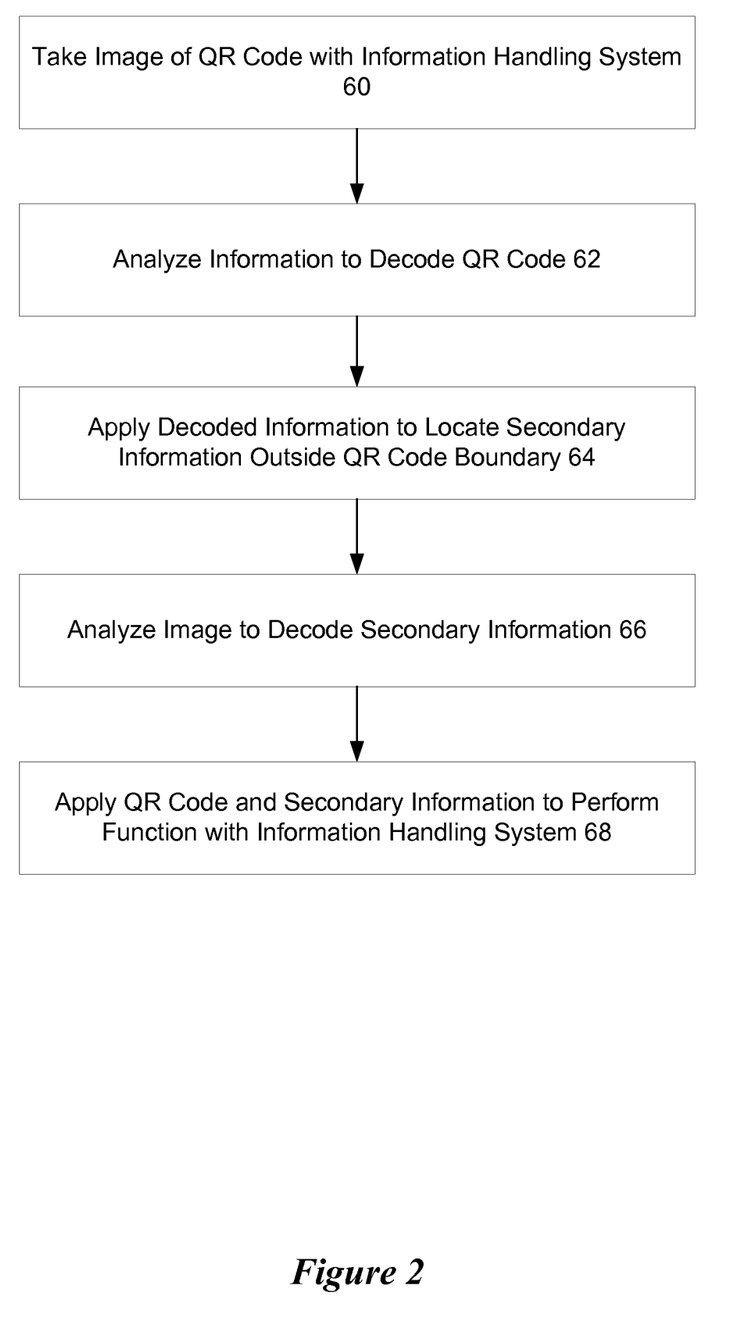
FIG. 2 depicts a flow diagram of one example process for capturing a two-dimensional barcode and secondary information to perform a function.

Referring now to FIG. 2, a flow diagram depicts one example process for capturing a two-dimensional barcode and secondary information to perform a function. The process begins at step 60 by taking an image of a QR code or other matrix barcode with a camera of an information handling system, such as a smartphone. The image captures the QR code and secondary information outside the boundary of the QR code, such as a serial number or shape of the product. At step 62, the image is analyzed to decode barcode information embedded in the QR code, such as a network address. At step 64, the barcode information is applied to locate secondary information outside of the QR code for use to perform a function. For example, the barcode information can indicate a location on the product where a serial number is located. Alternatively, the barcode information can indicate which digits of a serial code should be used to access a function. In alternative embodiments, the barcode information identifies information for an OCR application to analyze to generate digitized information to input into fields of a webpage for a web address embedded in the QR code, such as a MAC address to configure a WAP or a key to register software. At step 66, the image is analyzed as indicated by the barcode information to decode secondary information outside the barcode for application to perform a function. For instance, the OCR application reads characters proximate to but outside the QR code boundary. Alternatively, a position locator determines a GPS or network position of the product based upon the position of the smartphone that captured the image. Once the secondary information is determined and stored in memory in a digital format, at step 68 the barcode information and secondary information are applied to perform a function, such as communicating with a network address or e-mail address embedded in the QR code to send a serial number, key and/or MAC address printed as characters outside of the QR code.

Figure 3:
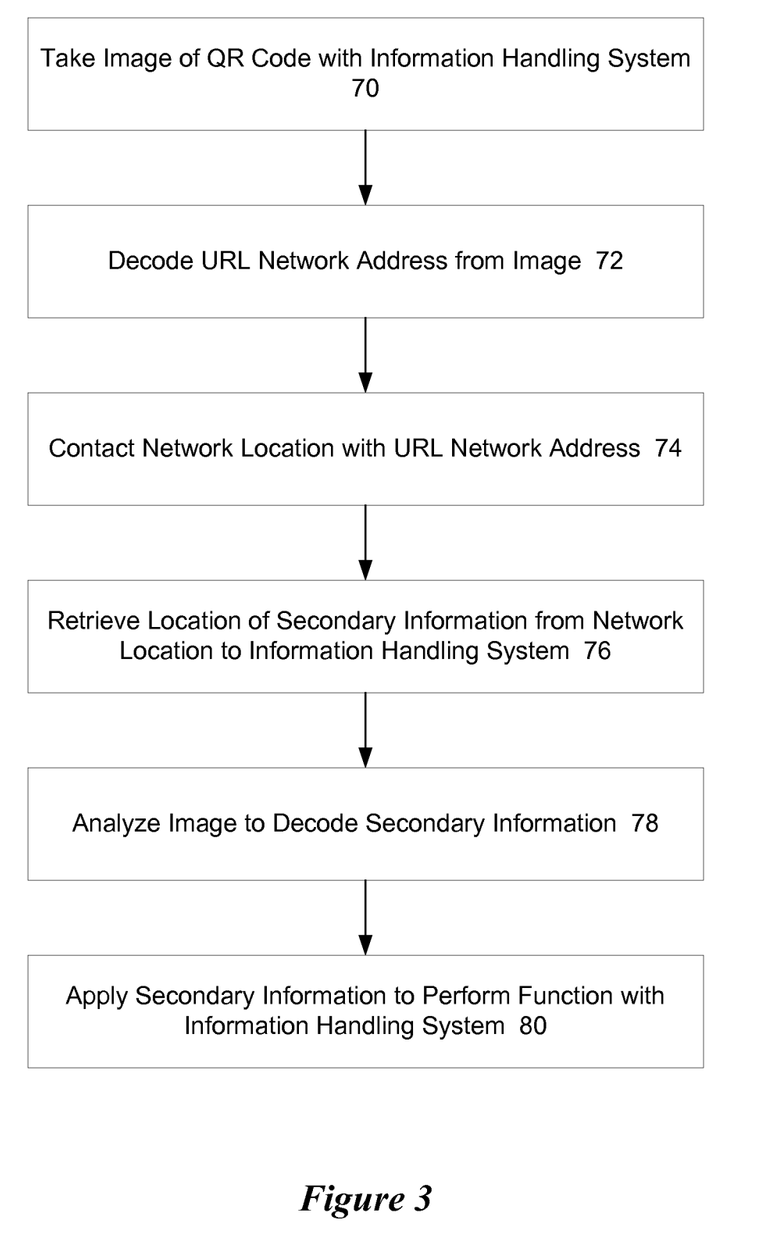
FIG. 3 depicts a flow diagram of another example process for capturing a two-dimensional barcode and secondary information to perform a function.

Referring now to FIG. 3, a flow diagram depicts another example process for capturing a two-dimensional barcode and secondary information to perform a function. The process begins at step 70 with the capture of an image of a QR code with an information handling system, such as by a smartphone camera. At step 72, a URL network address is decoded from the image by analyzing the QR code with the information handling system. At step 74, the information handling system contacts the network location associated with the URL network address. At step 76, the information handling system obtains the location or type of secondary information from the network location, such as the location of a MAC address relative to the QR code. In alternative embodiments, the location or type of secondary information is provided by the network location through a password accessed website, such as an account sign in or other password protection in order to restrict unauthorized access to information relating to the QR code for the specific product as identified by secondary information. At step 78, the information handling system analyzes the image of the QR code based upon inputs from the network location in order to determine the secondary information. In the example where the website is password protected, the secondary information may be arranged in an order defined by the network location to provide additional security. For example, selected characters from the serial number and MAC address in a selected order are appended to the network address provided by the QR code to download a second network location specifically associated with the product. At step 80, the secondary information and barcode information provided by the QR code are applied to perform a function, such as configuration of a WAP or registration of software. One advantage of inquiring with a network location using a network address from the QR code to determine the secondary information is that changes in the type of the secondary information may be retroactively adjusted after disposition of the QR code at a location or on a product.

Figure 4:
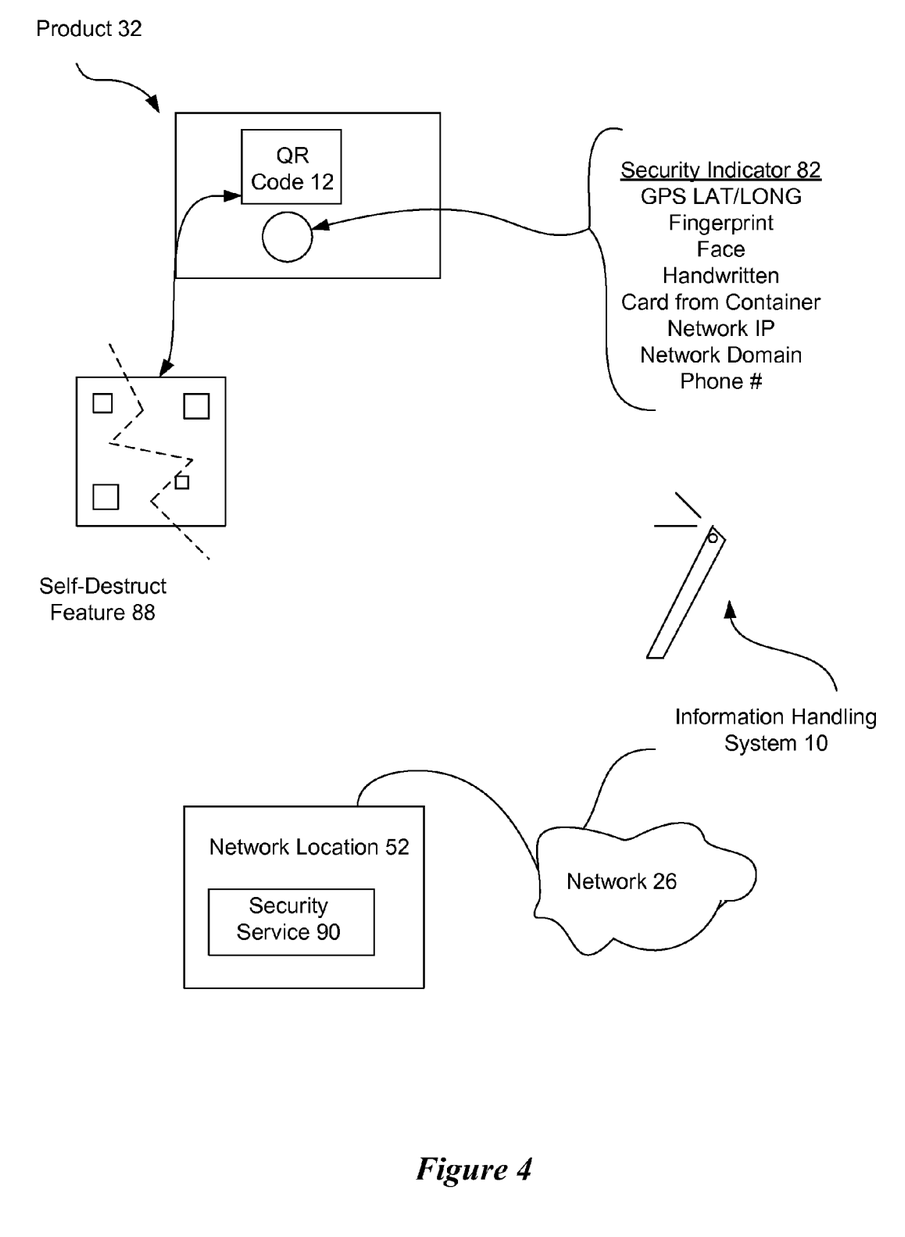
FIG. 4 depicts a mobile telephone capturing a two-dimensional barcode and a security indicator to access secure information stored in the two-dimensional barcode.

Referring now to FIG. 4, a mobile telephone 10 is depicted capturing a two-dimensional barcode 12 and a security indicator 82 to access secure information stored in the two-dimensional barcode 12. For example, QR code 12 is affixed to product 32 or a cardboard container that holds product 32 and then shipped from a manufacture location to an end user location. In one example embodiment, QR code 12 has shipping information embedded in it to aid shipping from a manufacturer location to an end user location. In an alternative embodiment, QR code 12 has product information for presentation at a retail store and to aid in configuration of the product after purchase by an end user from the retail store for use at the end user location. One difficulty with presenting information using a QR code in publicly accessible areas is that unauthorized individuals might capture an image of the QR code and then use the image at a later time to access the product. Security module 48 helps to prevent unauthorized access by applying various security indicators to prevent unauthorized access to information available through or embedded in QR code 12.

In the example embodiment depicted by FIG. 4, product 32 is a WAP having QR code 12 that provides access to a network location 52 for configuration of the WAP. QR code 12 includes unencrypted information 84 accessible to an end user with a QR code analyzer and also includes encrypted information 86 accessible to an end user with a key that unencrypts the information, such as a key acquired from or with a security indicator 82. QR code 12 has a self-destruct feature 88 that separates into at least two parts to make the information unreadable when QR code is pulled apart at the self-destruct feature 88. For example, QR code 12 is affixed to a location of product 32 or a container of product 32 so that setting up product 32 results in tearing of QR code 12 along self-destruct feature. In this manner, the information embedded in QR code 12 is used only once. In an alternative embodiment, a security service 90 running on network location 52 allows one use of information from QR code 12 and then prevents subsequent access to the information, such as by disabling a network address of QR code 12. Single access to information provided by QR code 12 allows an initial configuration of the product without subsequent usage by unauthorized users.

In various embodiments, various degrees of security are desired to reduce the risk of unauthorized access to information through a publicly displayed QR code 12, such as a QR code 12 presented at a product 32. In some instances, QR code 12 is encrypted to prevent access unless it is analyzed by a reader that has a key input by an end user to decrypt the information. However, this type of encryption means that an end user has to have the key in order to read information. In some instances, less secure encryption may present an obstacle to discourage unauthorized uses while providing a less complex usage model for inexperienced end users. For example, QR code 12 unencrypted information 84 provides a network address so that an unauthorized user who captures the QR code will go to the network address and be discouraged from believing that other information of interest is stored in the QR code. However, an authorized user, such as the end user receiving product 32, can obtain encrypted information by including a security indicator 82. In one embodiment, a local application on information handling system 10 analyzes an image taken of QR code 12 to determine if a security indicator 82 is included in the image as secondary information and then applies the secondary information to decrypt encrypted information 86. In an alternative embodiment, security indicator 82 is provided from other resources of information handling system 10, such as a GPS receiver, a telephone number, a domain name or IP address of information handling system 10 that is used as a key to decrypt encrypted information 86. In another alternative embodiment, security service 90 of network location 52 responds to a request for a website by determining authorization of a security indicator associated with an information handling system and in response to authorization provides a key to decrypt encrypted information 86. For example, security service 90 receives a GPS location, IP address, domain name or telephone number from information handling system 10 along with a request to a network address of unencrypted information 84 for a QR code 12 and provides a key to decrypt encrypted information 86 if GPS location, IP address, domain name or telephone number match that of an authorized user. Although this does not provide full-proof security, it does make unauthorized use of information from publicly viewable QR code more difficult.

In operation, an end user captures an image of QR code 12 with a camera integrated in information handling system 10 and analyzes the image to determine unencrypted information 84 with conventional QR code analysis. A security module running on information handling system 10 analyzes the image to determine encrypted information 86 based upon a preset security indicator, a setting in QR code 12, an independent analysis of the image, an end user input, instructions from security service 90 that are downloaded through network 26, or other factors. In one embodiment, security indicator 82 is included in the image of QR code 12 as secondary information. For example, security indicator 82 is a biometric factor, such as an image of an authorized end user's face or fingerprint, a handwritten code written proximate QR code 12 by the end user, or an item removed from a box that contains product 32. In one example of biometric security indicators, biometric factors provided from an end user to the product manufacturer are used to encrypt encrypted information 86 so that biometric logic of information handling system 10 can apply the biometric factors to decrypt the information. In one example of a handwritten code, the manufacturer encrypts information in QR code 12 with a key and provides the key to the end user before purchase, at purchase or after purchase of product 32. The end user writes the code instead of putting the code into the application running on information handling system 10 so that a secondary information analyzer can determine the code and apply the code to decrypt information of QR code 12. As an alternative, the end user opens packaging containing product 32 and removes a typewritten code from the packaging to place next to QR code 12 exposed at the packaging so that a secondary information analyzer can analyze the code. In one example, the code may be created by selecting predetermined characters already printed proximate to QR code 12, such as every other character of a serial number. In another alternative embodiment, QR code 12 is printed with plural colors so that unencrypted information is read with one color, such as using a conventional QR code analyzer to read black squares as black and all other squares as white, and to read encrypted information 86 by selecting one or more colors to treat as black squares. As an alternative, a color filter is included in packaging of product 32 so that colors presented by QR code 12 are filtered into secondary colors that provide unencrypted information when read as black squares. In each example where secondary information of an image is used as a security indicator, the end user can obtain the type and factors of the security indicator from local storage of information handling system 10, by inputting selections at information handling system 10, with an application having preset security indicator, by contacting a network location 52 or in other manners.

In some instances, security indicator 82 is secondary information that is not included in an image of QR code 12. In one example, information handling system 10 captures an image of QR code 12 and includes a GPS latitude and longitude value with the image. The manufacturer uses the delivery address of product 32 to determine a latitude and longitude value for encryption of encrypted information 86. Information handling system 10 applies all or part of the GPS values to decrypt QR code 12 upon delivery of product 32 to the correct address. In another example embodiment, the manufacturer of product 32 accepts an order for the product from a network location of the end user and applies the IP address or domain name of the end user to encrypt encrypted information 86 or QR code 12. Upon delivery, information handling system 10 detects the IP address or domain name to which it is interfaced and applies all or part of the IP address or domain name to decrypt the encrypted information. In one alternative embodiment, the GPS values, IP address, and/or domain name are include as inputs to a network location 52 provided by a network address of QR code 12. Information handling system 10 opens the network location, such as with a web browser using the network address extracted from QR code 12, and then inputs all or a selected portion of the GPS, IP address, domain name or other information into the network location to obtain access to additional information, such as configuration information located on the network address or a key to read encrypted information within QR code 12.

Figure 5:
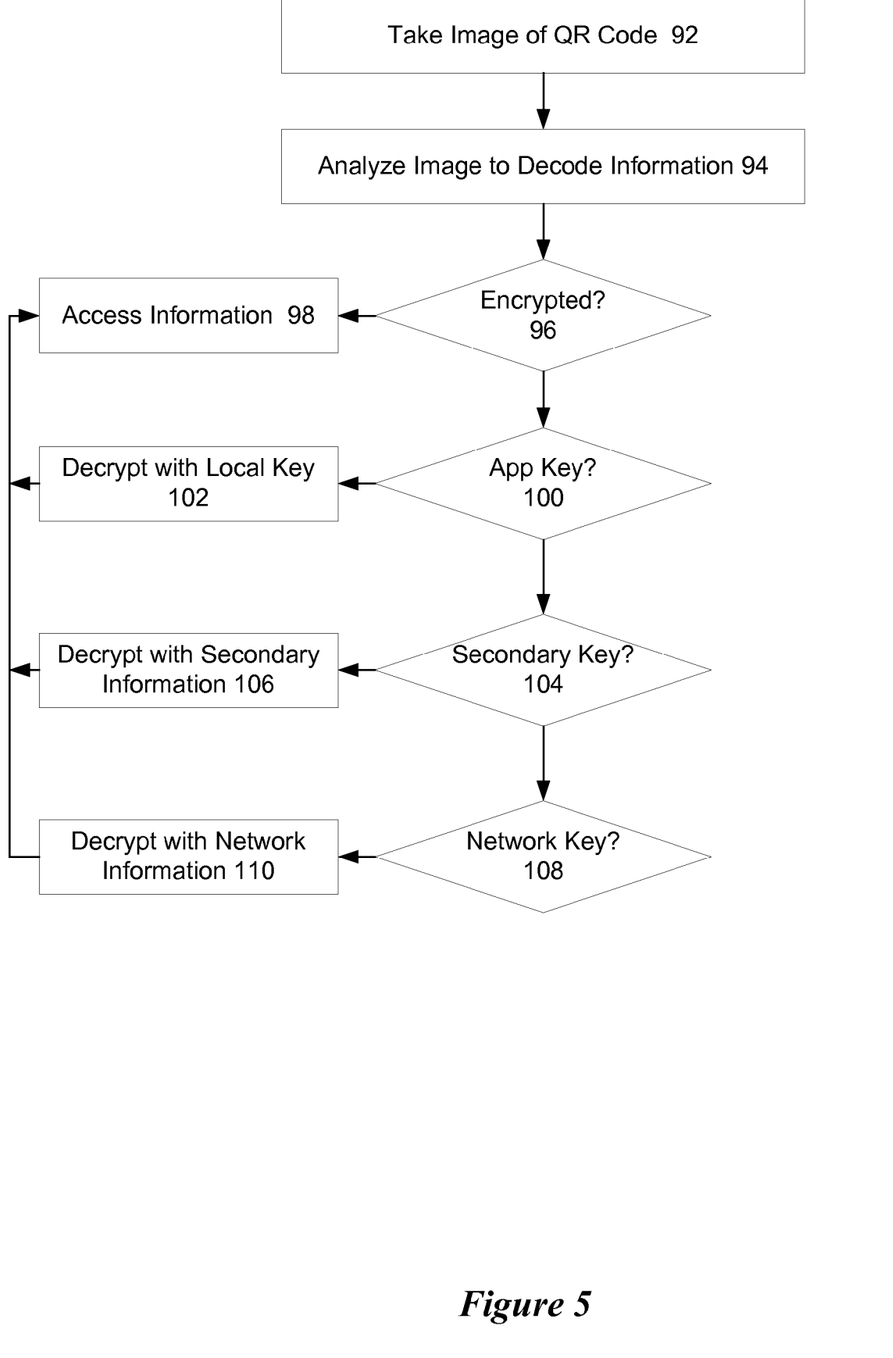
FIG. 5 depicts a flow diagram of a process for securing information in a visible two-dimensional barcode for use by authorized users.

Referring now to FIG. 5, a flow diagram depicts a process for securing information in a visible two-dimensional barcode for use by authorized users. The process starts at step 92 with capture of an image of a QR code or other matrix barcode using a camera integrated in an information handling system. At step 94, the image is analyzed to decode information stored in the QR code. At step 96, a determination is made of whether the QR code is associated with encrypted information, such as by encryption of information stored by the QR code or encryption of information available through a network address of the QR code. If the QR code does not include encrypted information, the process continues to step 98 to operate with the QR code information in a conventional manner, such as opening a web browser to an unencrypted network address stored in the QR code. In one embodiment, if the QR code is analyzed by a conventional QR code reader without the ability to detect associated encrypted information as described herein, the end user will open the network location without an indication of encrypted information and thus not have a reason to attempt to retrieve unauthorized information.

If at step 96 a determination is made that encrypted or otherwise restricted information is associated with the QR code, the process continues to step 100 to determine whether a key input by the end user is needed to operate on information of the QR code, such as a key to decrypt configuration information or a network address embedded in the QR code. If so, the process continues to step 102 to accept input of the key from an end user and then to step 98 to present the information at the information handling system or otherwise perform a function with the QR code information. If at step 100 a determination is made that a key input is not needed by an end user, the process continues to step 104 to determine if a secondary information key is needed to operate on information associated with the QR code, such as characters or biometrics captured in the image or other information associated with the image, like GPS, IP address, domain name, telephone number, etc. . . . If yes at step 104, the process continues to step 106 to determine the secondary information and apply the secondary information to perform a function with the information of the QR code at step 98. For example, the last four numbers of the telephone number of the mobile telephone that captured the image are used to decrypt an encrypted portion of the QR code in order to obtain configuration information to set up a product on which the QR code is affixed. If no at step 104, the process continues to step 106 to determine if a network key is needed to operate on information associated with the QR code. For instance, communication is initiated with a network location from a network address of the QR code to determine if secondary information provided from the information handling system will provide access to a restricted network address. If so, the process continues to step 110 to automatically provide the secondary information for access to restricted information, such as by providing restricted information from the network location or providing a key from the network location to decrypt information of the QR code. If at step 108 a network key is not indicated, the process continues to step 98 to present information or perform a function based upon unencrypted information provided from the QR code.

Figure 6:
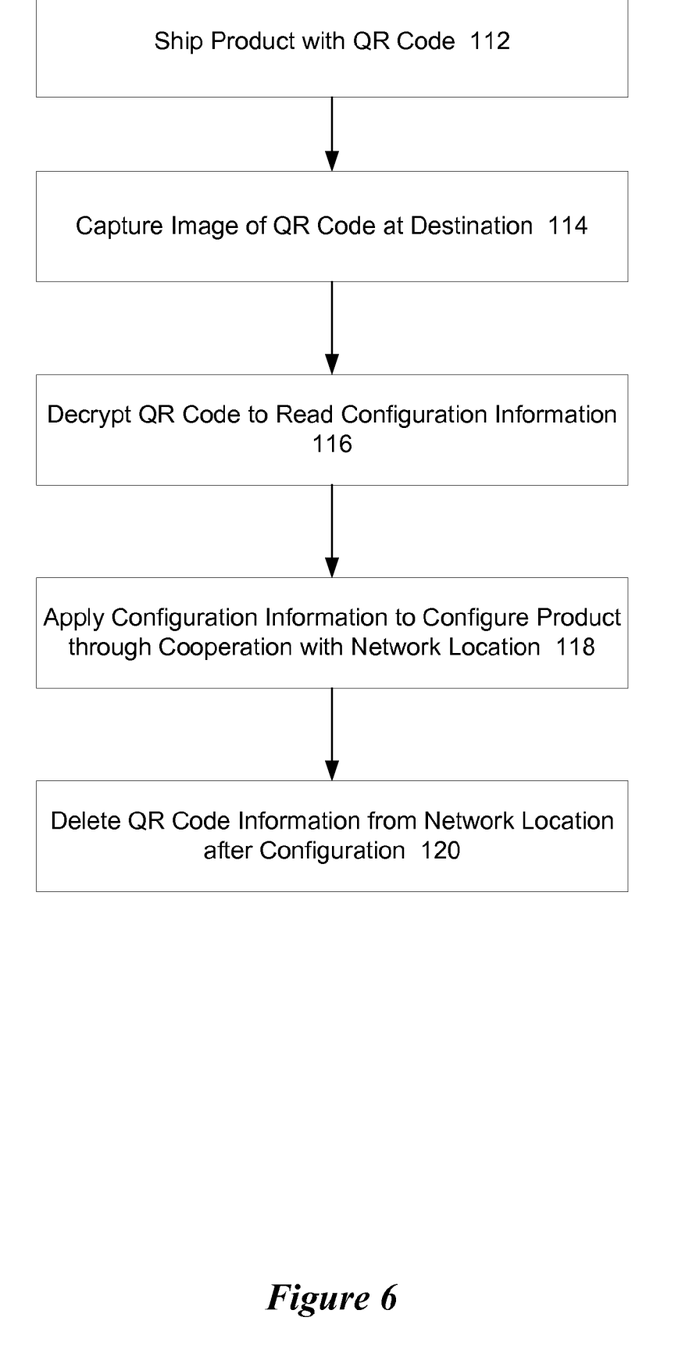
FIG. 6 depicts a flow diagram of a process for delivery of a product having a two-dimensional barcode with information stored in a manner restricted to authorized users.

Referring now to FIG. 6, a flow diagram depicts a process for delivery of a product having a two-dimensional barcode with information stored in a manner restricted to authorized users. At step 112, the product is shipped with a QR code attached, such as at the housing of the product or external packaging of the product. In one embodiment, the QR code is at least partially encrypted using secondary information that can be captured by an information handling system with the QR code, such as information associated with an intended end user that is used as a key for the encryption, like a GPS location or telephone number. In another embodiment, the QR code has unencrypted information that provides access to a network location based upon secondary information that can be captured by an information handling system with the QR code, such as a key provided in the package. At step 114, an image is captured of the QR code at the destination along with secondary information. At step 116, restricted information associated with the QR code is provided to perform a function at the information handling system, such as by applying secondary information to decrypt configuration information stored in the QR code or to access configuration information at a network location provided by the QR code. At step 118, the restricted information is applied with the information handling system to perform the function, such as configuration of the product. At step 120, the QR code is decommissioned after the function is completed to disable subsequent use of the QR code.

Although the present invention has been described in detail, it should be understood that various changes, substitutions and alterations can be made hereto without departing from the spirit and scope of the invention as defined by the appended claims.

What is claimed is:

1. A method for retrieving information stored with a two-dimensional barcode, the method comprising:
   capturing an image of the two-dimensional barcode with an information handling system;
   analyzing the image of the two-dimensional barcode to extract barcode information stored in the two-dimensional barcode;
   analyzing the image to determine secondary information from outside of the two-dimensional barcode;
   applying the barcode information together with the secondary information to perform a function;
   applying the barcode information to determine a location of the secondary information in the image;
   determining the secondary information with the location determined from the barcode information;
   applying the barcode information to determine a type of the secondary information in the image; and
   analyzing the image to locate secondary information of the type.

2. A method for retrieving information stored with a two-dimensional barcode, the method comprising:
   capturing an image of the two-dimensional barcode with an information handling system, wherein the image comprises an image of a product having the two-dimensional barcode and secondary information visibly attached proximate to each other;
   analyzing the image of the two-dimensional barcode to extract barcode information stored in the two-dimensional barcode;
   analyzing the image to determine secondary information from outside of the two-dimensional barcode;
   applying the barcode information together with the secondary information to perform a function, the function comprising obtaining product information from a network location;
   communicating with the network location using a network address from the barcode information; and
   communicating a product number to the network location, the product number from the secondary information.

3. The method of claim 2 wherein the product number is a unique identifier of the product printed as text proximate the two-dimensional barcode.

4. The method of claim 2 further comprising:
   obtaining a location of the secondary information from the network location; and
   in response to obtaining a location, analyzing the location to determine the secondary information.

5. A method for retrieving information stored with a two-dimensional barcode, the method comprising:
- capturing an image of the two-dimensional barcode with an information handling system, wherein the barcode information comprises a network address and the secondary information comprises text proximate the two-dimensional barcode;
- analyzing the image of the two-dimensional barcode to extract barcode information stored in the two-dimensional barcode;
- analyzing the image to determine secondary information from outside of the two-dimensional barcode; and
- applying the barcode information together with the secondary information to perform a function;
- wherein applying the barcode information together with the secondary information to perform a function further comprises inputting at least part of the text to the network address for authorization to access information.

6. The method of claim 5 wherein the authorization to access information comprises authorization to access configuration information associated with a product.

7. The method of claim 6 wherein the product comprises a device for communicating over a network and the text comprises a MAC address.

8. An information handling system comprising:
- a processor configured to process instructions;
- memory interfaced with the processor and configured to store the instructions;
- a camera interfaced with the processor and memory, the camera configured to capture an image and store the image in the memory;
- a two-dimensional barcode analyzer stored in the memory and configured to analyze the image to determine barcode information of a two-dimensional barcode captured by the image;
- an image recognition analyzer stored in the memory and configured to analyze the image to determine secondary information of the image located outside of the two-dimensional barcode; and
- an application stored in the memory and configured to apply the barcode information and the secondary information to perform a function;
- wherein the application comprises a browser operable to:
- communicate with a network location using a network address of the bar code information;
- retrieve a secondary information factor from the network location; and
- apply the secondary information factor to determine the location of secondary information of the image.

9. The information handling system of claim 8 wherein the secondary information comprises text and the image recognition analyzer comprises an optical character recognition module operable to capture characters included in the image.

10. The information handling system of claim 9 wherein the characters comprise a unique identifier of a product presented at the product proximate to the two-dimensional barcode.

11. The information handling system of claim 8 wherein the image recognition analyzer comprises a facial recognition analyzer, the secondary information comprises facial recognition information and the application comprises a security module operable to access a network location with a network address provided in the barcode information by providing the network location with the facial recognition information.

12. The information handling system of claim 8 wherein the application comprises a browser operable to communicate with a network location, the network location having a field to accept an input, the browser further operable to insert the secondary information into the field.

13. A method for interfacing with a network location, the method comprising:
- capturing an image of a two-dimensional barcode having a boundary;
- analyzing the two-dimensional barcode to determine a location of secondary information within the image and outside of the boundary; and
- analyzing the image to determine the secondary information.

14. The method of claim 13 wherein the secondary information comprises characters printed on a product proximate the two-dimensional barcode.

15. The method of claim 14 further comprising:
- analyzing the two-dimensional barcode to determine a network address; and
- communicating the secondary information through a network to the network address.

16. The method of claim 15 wherein the secondary information comprises a key associated with authorization to use the product.

17. The method of claim 15 wherein the product comprises a networking device and the secondary information comprises configuration information for configuration of the network device.

* * * * *